United States Patent Office 3,274,252
Patented Sept. 20, 1966

3,274,252
PROCESS FOR TERTIARY AMINE OXIDES AND HYDROXYLAMINES
Harry Elmer Albert and Paul Gordon Haines, Lafayette Hill, Pa., assignors to Pennsalt Chemicals Corporation, Philadelphia, Pa., a corporation of Pennsylvania
No Drawing. Filed July 9, 1963, Ser. No. 293,906
5 Claims. (Cl. 260—583)

This invention relates to an improved process for the preparation of tertiary amine oxides and N,N-di-lower alkylhydroxylamines. In the process of the invention, a trialkylamine is oxidized with hydrogen peroxide to the corresponding tertiary amine oxide. The tertiary amine oxide is subsequently converted by pyrolysis to dialkylhydroxylamines, which latter compounds are of particular utility in the stabilizing of styrene against premature polymerization during storage and shipping.

It is known to prepare tertiary amine oxides by hydrogen peroxide oxidation of tertiary alkylamines. In the processes known heretofore, however, the amount of hydrogen peroxide used was often substantially more than the stoichiometrical amount required for the oxidation. This was due to the instability of the peroxide and also to the fact that the oxidation procedure generally resulted in very poor conversions. Also, in previously known techniques, the reaction was carried out in a solvent system which had mutual solubility for both the tertiary amine which was oxidized and for the hydrogen peroxide which was normally added as its aqueous solution. In our work on this subject we have learned that certain catalysts accelerate the reaction rate between the tertiary amine and hydrogen peroxide whereby the oxidation to the amine oxide product proceeds more rapidly and in better conversion. Of these catalysts sodium tungstate is found to be particularly useful for accelerating the reaction rate, but its use has heretofore been in substantial quantities, on the order of 1% to about 10% by weight of the tertiary amine used, and it has been employed only in systems containing a solvent system. It is, of course, advantageous to carry out any reaction with a minimum amount of catalyst and particularly so when the catalyst is an expensive one, such as a tungstate. Likewise the hydrogen peroxide is an expensive reagent and it must be used in the minimum amount to make sure of an efficient low cost process.

It has now been found that a tertiary amine may be oxidized to an amine oxide in excellent conversion and yield using a very small amount of catalyst and essentially stoichiometric amounts of hydrogen peroxide and in the absence of any organic solvent. This is accomplished in accord with this invention by oxidizing in an aqueous medium a tri-lower alkylamine with essentially stoichiometric amounts of hydrogen peroxide in the presence of an amount of alkali metal tungstate as catalyst equivalent to 0.05 to 1.0 percent of the tri-lower alkylamine, the reaction medium additionally containing 0.02% to 1% by weight of the tri-lower alkylamine of an alkali metal pyrophosphate.

The process is carried out in an aqueous medium, no organic solvent system being required. Usually aqueous hydrogen peroxide is used as the oxidant and the commercially available solutions containing approximately 30% by weight of $H_2O_2$ are quite satisfactory. However, other concentrations of $H_2O_2$ may be used and even anhydrous $H_2O_2$ may be employed if it is not considered too hazardous to handle. Preferably, however, aqueous solutions of hydrogen peroxide containing from about 5% to 75% by weight of $H_2O_2$ will be employed. The amount of peroxide used should be essentially stoichiometric; less than stoichiometric amounts, of course, will leave tertiary amine unreacted. On the other hand, large excesses of peroxide are operable but contribute nothing to the process. If an excess is to be employed, about 10% over stoichiometric amounts may be used for such purposes so as to insure completion of the reaction, for example.

The catalysts useful in this process are, as indicated, the alkali metal tungstates, and this includes sodium tungstate, potassium tungstate, and the like. It will be understood that the alkali metal tungstates will usually be employed as the hydrated salts. The amount of catalyst used may vary considerably and in this process is effective at levels as low as 0.05% by weight of the tertiary amine used. There is no need in the process to use more than about 1% by weight, and preferably from 0.15 to 1% by weight of the amine will be employed.

The alkali metal pyrophosphate additive will usually be added in an amount between about 0.02% and 1.0% by weight of the amine employed, the preferred amount being 0.05 to 0.5%. The pyrophosphate may be sodium, potassium or other alkali metal pyrophosphates and they may be used as their readily available hydrates.

The process conditions and techniques used to carry out the process of this invention are generally conventional. Temperatures of between about 20° and 75° C. will normally be used. Although the mode of addition is not important, it is preferred to add the hydrogen peroxide to a stirred mixture of the amine, catalyst and pyrophosphate. The reaction may be followed by determining the amount of unreacted hydrogen peroxide in an aliquot sample taken from the reaction mass. The amine oxide product may, if desired, be isolated from the reaction mass by filtering off the catalyst and vacuum distilling the solvent and isolating the amine oxide from the concentrate in the form of its picrate or other salt. However, the amine oxide may be used directly for conversion to a hydroxylamine, and thus the amine oxide concentrate may be used without isolation procedures. The amines that will be employed in this process may be any tertiary amine having the formula

where $R_1$, $R_2$ and $R_3$ are alkyl groups containing from 1 to 6 carbon atoms. The $R_1$, $R_2$ and $R_3$ groups may be the same or different, and thus operable amines in this process include trimethylamine, triethylamine, tributylamine, methyldiethylamine, ethyldimethylamine, triamylamine, tri-n-hexylamine, n-butyldiethylamine, and the like.

In the general procedure for carrying out the peroxide oxidation, the tertiary amine is charged to the reaction vessel and the catalyst and sodium pyrophosphate added. The reaction vessel is fitted with a stirrer, a reflux condenser and means for adding the hydrogen peroxide. Control of temperature is obtained by heating or cooling as required by the reaction conditions, and provision is made for temperature indication. Agitation is started and hydrogen peroxide is added at a rate chosen so as not to exceed the desired reaction temperature. The reaction is maintained by adding the peroxide and the extent of completion of the reaction is determined by sampling at various times and titrating the hydrogen peroxide iodometrically with standard sodium thiosulfate solution. The reaction is continued until less than about 1% of the hydrogen peroxide charged remains in the reaction vessel. After completion of the reaction, the charge is distilled to remove any unchanged trialkylamine, the distillation being carried out under reduced pressure. Distillation is continued to remove most of the water and distillation is terminated, if desired, just prior to reaching the pyrolysis temperature of the trialkylamine oxide. When conversion to the N,N-dialkylhydroxylamine is desired, the trialkylamine oxide is pyrolyzed directly by raising the temperature and maintaining the distillation procedure. The first fraction that comes over contains most of the water not removed in the dehydration step and a second fraction contains the majority of the product and this product is of good purity, being on the order of about 95% or better N,N-dialkylhydroxylamine. As an alternative method of pyrolysis, the crude trialkylamine oxide is fed continuously to an inert oil, preferably a low cost paraffin oil, maintained at a suitable pyrolysis temperature. Preferably a vacuum is used in the pyrolysis system so that the dialkylhydroxylamine is removed from the hot oil as it is formed and obtained as a distillate.

The following examples will more clearly describe and characterize the invention.

*Example*

A 5-liter 3-necked flask fitted with stirrer, reflux condenser, thermometer and addition funnel was provided with heating and cooling means. The reaction flask was charged with 1616 grams of triethylamine and 2.4 grams of $Na_2WO_4 \cdot 2H_2O$ (0.14% of catalyst based on the weight of triethylamine). Then 1600 grams of 35% $H_2O_2$ was added with agitation over a 5 hour period, the reaction temperature being held at 54° C. When the addition was complete the reaction mass was stirred an additional three hours at 68° C. until iodometric titration of a sample showed complete utilization of the hydrogen peroxide added. The condenser was then set for distillation and by carrying out distillation at a pressure of 150 mm., 264 grams of unreacted triethylamine was collected at 35–45° C. A second fraction consisting mostly of water was collected at 50–70° C. at 75 mm., and the product remaining behind consisted of 1820 grams of crude triethylamine oxide.

For the pyrolysis of the crude triethylamine oxide, a 1-liter 3-necked flask was provided with a stirrer, a thermometer well, an addition funnel and a distilling head which was connected to a condenser and a receiver for the product. Two hundred grams of a pariffin oil (Topaz B oil) was placed in the flask and the system was then evacuated by a mechanical pump to a pressure of about 75 mm. Heating was accomplished by an electric mantle. After a temperature in the desired pyrolysis range (105–115° C.) had been reached, addition of the crude triethylamine oxide was started. The rate of addition was controlled so that 500 grams of crude triethylamine oxide was added in 2 hours. After completion of the addition of the triethylamine oxide, the heating at the pyrolysis temperature was continued for 30 minutes. The product in the receiver consisted of 282.5 grams of an upper layer containing 87.5% diethylhydroxylamine (by vapor phase chromatography analysis) and 72 grams of a lower aqueous layer containing 23.8% of diethylhydroxylamine. Thus the yield of diethylhydroxylamine from a 500 gram sample of triethylamine oxide was 264.1 grams. Overall conversion, based on triethylamine, was calculated using this weight and correcting for the reaction mixture used up by hydrogen peroxide titrations. Overall yield, based on triethylamine, was calculated in a similar manner, but making allowance for the triethylamine recovered. These calculations showed that an overall conversion of 67.4% and a yield of 80.6% of diethylhydroxylamine product were obtained.

The above procedure was carried out in exactly the same way except that the initial charge to the reaction flask contained 0.8 gram of $Na_4P_2O_7 \cdot 10H_2O$ (0.29% $Na_4P_2O_7$ based on triethylamine) in addition to the triethylamine and sodium tungstate catalyst. The unreacted triethylamine in this case was 232 grams and the triethylamine oxide product consisted of 1867 grams. In the pyrolysis step, a 78.9% overall conversion and a 92.1% overall yield of N,N-diethylhydroxylamine were obtained. Thus, by the process of this invention yields and conversion to diethylhydroxylamine were significantly increased.

In like manner, use of potassium tungstate and potassium pyrophosphate, both at 1% by weight of the amine, gives similar results to those shown above. Excellent results are also obtained when the tungstate catalyst concentration is 0.05% and the pyrophosphate is 0.02% by weight of the amine. Instead of using triethylamine, trimethylamine, tri-n-hexylamine and n-butyldiethylamine may be used to obtain similar advantages with the process.

It will be understood that numerous changes and modifications may be made without departing from the spirit and scope of the invention.

We claim:
1. The process of oxidizing in an aqueous system a tri-lower alkylamine employing as oxidizer essentially stoichiometric amounts of hydrogen peroxide, said oxidation being carried out at a temperature between about 20° and 75° C. in the presence of 0.05 to 1.0 weight percent of the amine of an alkali metal tungstate as catalyst, and in the presence of 0.02 to 1% by weight of the amine of an alkali metal pyrophosphate and thereafter pyrolyzing the oxidation product by distilling the aqueous mass and collecting as distillate N,N-di-lower alkylhydroxylamine.

2. The process of oxidizing in an aqueous system triethylamine employing as oxidizer essentially stoichiometric amounts of hydrogen peroxide, said oxidation being carried out at a temperature between about 20° and 75° C. in the presence of 0.05 to 1.0 weight percent of the amine of an alkali metal tungstate as catalyst, and in the presence of 0.02 to 1% by weight of the amine of an alkali metal pyrophosphate and thereafter pyrolyzing the oxidation product by distilling the aqueous mass and collecting as distillate N,N-diethylhydroxylamine.

3. The process of claim 2 wherein sodium tungstate and sodium pyrophosphate are used.

4. The process of oxidizing in an aqueous system a tri-lower alkylamine, employing as oxidizer essentially stoichiometric amounts of hydrogen peroxide, said oxidation being carried out at a temperature between about 20° and 75° C. in the presence of 0.05 to 1.0 weight percent of the amine of an alkali metal tungstate as catalyst and in the presence of 0.02 to 1 percent by weight of the amine of an alkali metal pyrophosphate.

5. The process of preparing triethylamine oxide which comprises oxidizing triethylamine at a temperature between about 20° and 75° C. in an aqueous system with an essentially stoichiometric amount of hydrogen peroxide and having present in the reaction medium 0.05 to 1.0% by weight of the triethylamine of sodium tungstate as catalyst and 0.02 to 1% by weight of the amine of sodium pyrophosphate.

References Cited by the Examiner

UNITED STATES PATENTS 3,047,579   7/1962   Witman _____ 260—583 X

OTHER REFERENCES

Mamlock et al.: Chemische Berichte, vol. 33, p. 161 (1900).

CHARLES B. PARKER, *Primary Examiner.*

ANTON H. SUTTO, *Assistant Examiner.*